United States Patent
Jensen

(10) Patent No.: US 6,258,139 B1
(45) Date of Patent: Jul. 10, 2001

(54) POLYCRYSTALLINE DIAMOND CUTTER WITH AN INTEGRAL ALTERNATIVE MATERIAL CORE

(75) Inventor: Kenneth M. Jensen, Springville, UT (US)

(73) Assignee: U S Synthetic Corporation, Orem, UT (US)

( * ) Notice: Subject to any disclaimer, the term of this patent is extended or adjusted under 35 U.S.C. 154(b) by 0 days.

(21) Appl. No.: 09/468,054

(22) Filed: Dec. 20, 1999

(51) Int. Cl.⁷ ............................. B24D 3/04; B24D 17/00
(52) U.S. Cl. ................ 51/307; 51/309; 51/293; 51/295; 428/408; 428/698
(58) Field of Search .............. 51/307, 309, 293, 51/295; 428/408, 698

(56) References Cited

U.S. PATENT DOCUMENTS

| | | | |
|---|---|---|---|
| 4,215,999 | * 8/1980 | Phaal | 51/295 |
| 4,259,090 | 3/1981 | Bovenkerk | 51/309 |
| 4,268,276 | * 5/1981 | Bovenkirk | 51/295 |
| 4,373,593 | * 2/1983 | Phaal et al. | 175/329 |
| 4,380,471 | 4/1983 | Lee et al. | 419/11 |
| 4,466,938 | 8/1984 | Gigl et al. | 264/332 |
| 4,592,433 | 6/1986 | Dennis | 175/329 |
| 4,714,120 | 12/1987 | King | 175/329 |
| 4,984,642 | 1/1991 | Renard et al. | 175/329 |
| 5,007,493 | 4/1991 | Coolidge et al. | 175/329 |
| 5,011,515 | 4/1991 | Frushour | 51/307 |
| 5,045,092 | 9/1991 | Keshavan | 51/293 |
| 5,119,714 | 6/1992 | Scott et al. | 76/108.2 |
| 5,158,148 | 10/1992 | Keshavan | 175/426 |
| 5,159,857 | 11/1992 | Jurewicz | 76/108.2 |
| 5,173,090 | 12/1992 | Scott et al. | 51/293 |
| 5,195,403 | 3/1993 | Sani et al. | 76/108.6 |
| 5,248,006 | 9/1993 | Scott et al. | 175/420.2 |
| 5,273,125 | 12/1993 | Jurewicz | 175/420.2 |
| 5,310,512 | 5/1994 | Bigelow | 264/25 |
| 5,441,817 | 8/1995 | Rai | 428/551 |
| 5,451,430 | 9/1995 | Anthony et al. | 427/372.2 |
| 5,469,927 | 11/1995 | Griffin | 175/432 |
| 5,484,330 | 1/1996 | Flood et al. | 451/540 |
| 5,486,137 | 1/1996 | Flood et al. | 451/540 |
| 5,494,477 | 2/1996 | Flood et al. | 451/540 |
| 5,501,909 | 3/1996 | Higaki et al. | 428/408 |
| 5,510,193 | 4/1996 | Cerutti et al. | 428/552 |
| 5,560,754 | 10/1996 | Johnson et al. | 51/297 |
| 5,603,070 | 2/1997 | Cerutti et al. | 419/6 |
| 5,662,720 | 9/1997 | O'Tighearnaigh | 51/295 |
| 5,669,271 | 9/1997 | Griffin et al. | 76/108.2 |
| 5,672,395 | 9/1997 | Anthony et al. | 427/444 |
| 5,743,346 | 4/1998 | Flood et al. | 175/420.2 |
| 5,804,321 | 9/1998 | Thorpe et al. | 428/623 |
| 5,819,862 | 10/1998 | Matthias et al. | 175/428 |
| 5,820,985 | 10/1998 | Chow et al. | 428/408 |

* cited by examiner

Primary Examiner—Michael Marcheschi
(74) Attorney, Agent, or Firm—Lloyd W. Sadler

(57) ABSTRACT

A cutting element, insert or compact, is provided for use with drills used in the drilling and boring of subterranean formations or in machining of metal, composites or woodworking. This new insert besides having a superabrasive layer on the surface of a substrate, also may have one or more superabrasive core element sections incorporated in the substrate to provide improved internal residual stress characteristics. By so manipulating residual stresses, this invention provides cutting elements, which are more fracture resistant thereby providing improved work life. Also, by providing additional superabrasive material in the substrate, this invention improves the cutting efficiency of the compact after the compact has undergone significant wear. Another embodiment of this invention employs one or more carbide core regions within a superabrasive region, which covers the majority of the outer surface of the insert.

12 Claims, 11 Drawing Sheets

POLYCRYSTALLINE DIAMOND CUTTER WITH AN INTEGRAL ALTERNATIVE MATERIAL CORE

BACKGROUND OF THE INVENTION

1. Field of the Invention

This invention relates to devices for drilling and boring through subterranean formations. More specifically, this invention relates to polycrystalline diamond compacts (PDCs), also known as cutting elements or diamond inserts, which are intended to be installed as the cutting element of a drill bit to be used for boring through rock in any application, such as oil, gas, mining, and/or geothermal exploration, requiring drilling through geological formations. Still more specifically, this invention relates to polycrystalline diamond inserts, which have a fully enclosed alternative material structure to minimize high tensile stresses in the diamond compact, minimize crack propagation, and to enhance abrasion resistance.

2. Description of Related Art

Polycrystalline diamond compacts (PDCs) are used in down hole tools, such as drill bits (including percussion bits; rolling cone bits, also referred to as rock bits; and drag bits, also called fixed cutter bits), reamers, stabilizers and tool joints. A number of different configurations, materials and geometries have been previously suggested to enhance the performance and/or working life of the PDC. Typically, PDCs have uniform internal regions, either being solid diamond, or, more commonly having a relatively thin diamond layer on the top or cutting surface of a solid carbide structure.

By way of introduction, a polycrystalline diamond compact (PDC), or cutting element, is typically fabricated by placing a cemented tungsten carbide substrate into a refractory metal container (can) with a layer of diamond crystal powder placed into the can adjacent to one face of the substrate. Additional cans are used to completely enclose the diamond powder and the carbide substrate. A number of such can assemblies are loaded into a high-pressure cell made from a low thermal conductivity extrudable material such as pyrophyllite or talc. The loaded high-pressure cell is then placed in a high-pressure press. The entire assembly is compressed under high pressure and temperature conditions. This causes the metal binder from the cemented carbide substrate to sweep from the substrate face through the diamond grains and to act as a reactive phase to promote the sintering of the diamond grains. The sintering of the diamond grains causes the formation of a polycrystalline diamond structure. As a result the diamond grains become mutually bonded to form a diamond mass over the substrate face. The metal binder may remain in the diamond layer within the pores of the polycrystalline structure or, alternatively, it may be removed via acid leaching and optionally replaced by another material forming so-called thermally stable diamond (TSD). Variations of this general process exist and are described in the related art. This detail is provided so the reader may become familiar with the concept of sintering a diamond layer onto a substrate to form a PDC insert. For more information concerning this process, the reader is directed to U.S. Pat. No. 3,745,623, issued to Wentorf Jr. et al., on Jul. 7, 1973.

For general background material, the reader is directed to the following United States Patents, each of which is hereby incorporated by reference in its entirety for the material contained therein.

U.S. Pat. No. 4,259,090 describes an improvement in the manufacture of diamond compacts in which a cylindrical mass of polycrystalline diamond is surrounded by and bonded to an outer mass of metal which provides support for the diamond.

U.S. Pat. No. 4,380,471 describes a polycrystalline diamond body infiltrated by a silicon atom-containing metal is bonded to a substrate, that comprises cemented carbide with a barrier of refractory material extending between the diamonds cemented together with silicon atom-containing binder and substrate substantially precluding migration of the cemented medium from the carbide substrate into contact with the silicon atom-containing bonding medium in the diamond body.

U.S. Pat. No. 4,466,938 describes a process for making compacts containing diamond, which reduces crystal flaws within the diamond.

U.S. Pat. No. 4,592,433 describes a cutting blank, preferably for use on a drill bit for cutting through earth formations, that comprises a substrate formed of a hard material and includes a cutting surface, with a plurality of shallow grooves, with strips of diamond disposed in the grooves.

U.S. Pat. No. 4,714,120 describes an earth boring bit that has a body with one end connected to a drill string member for rotation and has an opposite end with a matrix formed thereon. A plurality of cutting elements are mounted on the matrix for dislodging geological formations.

U.S. Pat. No. 4,984,642 describes a composite tool that comprises a sintered metal carbide support and a polycrystalline diamond active part having an inner surface of metallurgical connection to the support and an outwardly facing working surface.

U.S. Pat. No. 5,007,493 describes a cutting element retention system for a diamond drill bit.

U.S. Pat. No. 5,011,515 describes a compact blank for use in operations that require very high impact strength and abrasion resistance.

U.S. Pat. Nos. 5,045,092 and 5,158,148 describe cemented tungsten carbide rock bit inserts that has diamond particles dispersed therein for enhanced hardness and wear resistance.

U.S. Pat. No. 5,119,714 describes an earth boring bit of the type having one or more rotatable cones secured to bearing shafts, a cutting structure having diamond compacts used as wear resistant inserts.

U.S. Pat. No. 5,159,857 describes a single piece earth boring bit of the type having a body that includes a solid bit face on one end and a shank on the opposite end for connection in a drill string, and a cutting structure having diamond compacts used as wear resistant inserts.

U.S. Pat. No. 5,173,090 describes a method for manufacturing a diamond compact of the type used as a cutting insert.

U.S. Pat. No. 5,195,403 describes a method of producing a composite cutting insert for a twist drill that includes the steps of cutting an intermediate blank from a composite diamond compact.

U.S. Pat. No. 5,248,006 describes an earth boring bit of the type having one or more rotatable cones secured to bearing shafts, an improved cutting structure having diamond compacts used as wear resistant inserts.

U.S. Pat. No. 5,273,125 describes a single piece earth boring bit of the type having a body that includes a solid bit face on one end and a shank on the opposite end for connection in a drill string, an improved cutting structure having diamond compacts used as wear resistant inserts.

U.S. Pat. No. 5,310,512 describes a method and apparatus for producing a non-planar synthetic diamond structure of predetermined shape.

U.S. Pat. No. 5,441,817 describes a method for making diamond and CBN composites, under HP/HT conditions.

U.S. Pat. No. 5,451,430 describes a stress relieved CVD diamond that is produced by annealing said CVD diamond at a temperature above about 1100 to about 2200 degrees Centigrade in an non-oxidizing atmosphere at a low pressure or vacuum and for a suitable short period of time, which decreases with increasing annealing temperature so as to prevent graphitization of said diamond.

U.S. Pat. No. 5,469,927 describes a preform cutting element, particularly for a drag-type rotary drill bit, comprises a thin cutting table of polycrystalline diamond, a substrate of cemented tungsten carbide, and a transition layer between the cutting table and substrate, cutting table, transition layer, and substrate having been bonded together in a high pressure, high temperature press.

U.S. Pat. No. 5,484,330 describes an abrasive tool insert that comprises a cemented metallic substrate and a polycrystalline diamond layer formed thereon by high pressure, high temperature processing.

U.S. Pat. No. 5,486,137 describes an abrasive tool insert having an abrasive particle layer having an upper surface, an outer periphery, and a lower surface integrally formed on a substrate, which defines an interface therebetween.

U.S. Pat. No. 5,494,477 describes an abrasive tool insert that comprises a cemented substrate and a polycrystalline diamond layer formed thereon by high pressure, high temperature processing.

U.S. Pat. No. 5,501,909 describes a diamond substrate having a smooth surface, including a polycrystalline diamond film having a surface with a pit, and an insulating material other than diamond, which occupies the pit.

U.S. Pat. Nos. 5,510,193 and 5,603,070 describe a metal carbide supported polycrystalline diamond (PCD) compacts that have improved shear strength and impact resistance properties, and a method for making the same under high temperature/high pressure (HT/HP) processing conditions.

U.S. Pat. No. 5,524,719 describes an insert for drill bits that is formed with an elongate body, typically having a cylindrical cross section terminating at an exposed outer end, which is covered with a polycrystalline disc. The polycrystalline disk is reinforced with an insert, which is wholly captured in the polycrystalline material.

U.S. Pat. No. 5,560,754 describes a polycrystalline diamond and cubic boron nitride (CBN) composite compact and a method for making the same under high temperature/high pressure (HT/HP) processing.

U.S. Pat. No. 5,590,729 describes a cutting element for a rotary drill bit that includes a substantially planar table of superhard material having a cutting face and a cutting edge. The table may be reinforced against bending with one or more strut portions extending from the rear of the substrate and at least partially across the cutting element.

U.S. Pat. No. 5,662,720 describes a cutting element that comprises a diamond layer and metal carbide substrate. The diamond layer and the metal carbide substrate form an egg-carton shaped interface.

U.S. Pat. No. 5,669,271 describes a preform cutting element for a drag-type rotary drill bit that includes a facing table of polycrystalline diamond bonded to a less hard substrate, such as cemented tungsten carbide.

U.S. Pat. No. 5,672,395 describes a method for treating as as-grown chemical vapor deposited (CVD) starting diamond film having stresses and containing voids.

U.S. Pat. No. 5,743,346 describes an abrasive cutting element comprised of an abrasive cutting layer and a metal substrate wherein the interface therebetween has a tangential chamfer, the plane of which forms an angle of about 5 degrees to about 85 degrees with the plane of the surface of the cylindrical part of the metal substrate.

U.S. Pat. No. 5,804,321 describes a unitary article that is solid at a temperature in excess of about 1100 degrees Centigrade, which includes a diamond, a metal, and a brazing material brazing the diamond and the metal.

U.S. Pat. No. 5,819,862 describes downhole components for use in subsurface drilling.

U.S. Pat. No. 5,820,985 describes a polycrystalline diamond layer attached to a cemented metal carbide structure used as a cutter wherein the cutter has improved toughness or fracture resistance during use through the boron, beryllium or the like therein.

SUMMARY OF THE INVENTION

In drill bits, which are used to bore through subterranean geologic formations, it is often desirable to provide a compact that avoids high tensile stresses in the diamond layer, while providing diamond compression to minimize diamond crack propagation. Moreover, it is desirable to provide a polycrystalline diamond cutter that has an additional diamond region, which will be exposed after the cutter has worn sufficiently to erode the carbide wall.

Therefore, it is an object of this invention to provide a PDC with an internal diamond core in the substrate, to provide additional diamond for exposure when the substrate is sufficiently eroded.

It is a further object of this invention to provide a PDC with an internal carbide core, which is entirely enclosed by the diamond region of the PDC cutter, to avoid high tensile stresses in the diamond region.

It is a further object of this invention to provide a PDC with increased diamond mass for abrasion resistance.

It is a further object of this invention to provide a PDC with improved internal stress characteristics.

It is a further object of this invention to provide a PDC, with reduced crack propagation in the diamond portion of the PDC.

These and other objectives, features and advantages of this invention, which will be readily apparent to those of ordinary skill in the art upon review of the following drawings, specification, and claims, are achieved by the invention as described in this application.

Reference will now be made in detail to the present preferred embodiments of the invention, examples of which are illustrated in the accompanying drawings.

DETAILED DESCRIPTION OF THE INVENTION

This invention is intended for use in cutting tools, most typically roller cone bits, drag bits or fixed-cutter bits, percussion bits, and/or metal machining or woodworking tools. A typical bit or tool has a plurality of PDCs mounted on its cutting surface. When the bit is rotated, the leading edge of one or more PDCs comes into contact with the rock or work surface. During a drilling or machining operation, the stresses and pressures imposed on each PDC require that the PDC be capable of sustaining high stresses and that the diamond layer of the PDC be strong. Moreover, as the PDC comes into repeated contact with the work surface, residual stresses internal to the PDC can significantly diminish the working life of the PDC. This invention directly addresses the problem of PDC failure due to residual stresses by providing a PDC with a core having different material properties from the surrounding region. Such a PDC can provide tailored structural support and/or compressibility. The manipulation of the residual stress can thereby increase the working life of the PDC. Two general embodiments of this invention are presented in this disclosure. The first is a PDC having a carbide substrate and a superabrasive face region, which also has an integral diamond (or other superabrasive material) core within the substrate. The second embodiment is a PDC having a predominantly superabrasive outer surface, with at least one internal carbide core. The two embodiments may also be employed jointly to further provide the advantages described above. A number of exemplary specific embodiments of each general embodiment are also described to provide the reader with an idea of the types of core geometry which are compatible and contemplated in this invention. For the purposes of this disclosure the term diamond shall be defined to mean polycrystalline diamond, polycrystalline cubic boron nitride or other superabrasive materials, which can be substituted for polycrystalline diamond in the manufacture of compacts or cutters for drilling, machining, woodworking, or the like. Also, for the purposes of this disclosure the term carbide shall be defined to be a material selected from one or more of the following materials: tungsten carbide, boron tetracarbide, tantalum carbide, titanium carbide, vandium carbide, niobium carbide, halfnium carbide, zirconium carbide, or the like.

Figure 1:
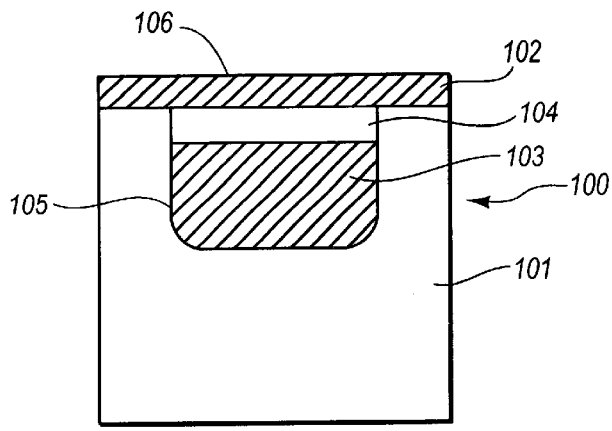
FIG. 1 depicts a section view of a preferred PDC having a diamond region completely enclosed within the carbide substrate.

FIG. 1 shows the section view of a preferred embodiment of a PDC 100. This PDC 100 has a carbide substrate 101 into which a cavity 105 is provided. Within the cavity 105 a diamond core 103 is sintered in place. Atop the diamond core 103 a carbide region 104 provides a cover for the diamond core 103 and acts as a buffer region for the diamond surface region 102 sintered to form the top cutting surface 106 of the PDC 100. In this preferred embodiment 100 of the invention the carbide regions 101, 104 completely surround the diamond core 103. Although, as the PDC 100 wears in use both the diamond surface region 102 and the carbide 101, 104 may wear away exposing the diamond core 103 and providing additional cutting life of the PDC 100. The diamond core 103 may or may not be the same material composition as the diamond surface region 102 and the carbide substrate 101 may or may not necessarily be the same material composition as the carbide region 104.

FIGS. 2a–m show a variety of different embodiments of this invention having a carbide substrate with enclosed diamond regions. These figures are intended to be examples of the variety of embodiments of PDCs of this invention and are not intended to be exhaustive or limiting.

Figure 2A:
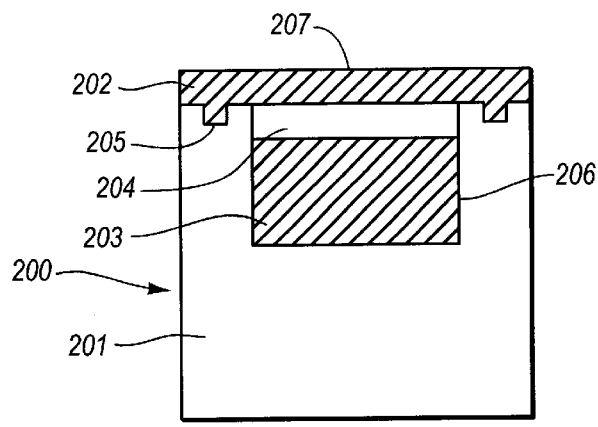
FIGS. 2a–m depict section views of alternative substrates with enclosed diamond regions of this invention.

FIG. 2a shows the cross section of an alternative embodiment of the PDC 200 of this invention. A carbide substrate 201 is provided with a cavity 206, within which a diamond core 203 is sintered in place. A carbide region 204 provides a cover for the diamond core 203 and provides a carbide buffer for the diamond surface region 202, which is sintered to the carbide substrate 201 and the carbide region 204 to provide the cutting surface 207. This embodiment 200 of the invention is provided with a ring 205 of diamond extending from the diamond surface region 202 into the carbide substrate 201 to provide improved adhesion properties. Again, in this embodiment 200 of the invention the carbide regions 201, 204 completely surround the diamond core 203. Although, as the PDC 200 wears both the diamond surface region 202 and the carbide 201, 204 may wear away exposing the diamond core 203 and providing additional cutting life of the PDC 200. The diamond core 203 may or may not be the same material composition as the diamond surface region 202 and the carbide substrate 201 may or may not necessarily be the same material composition as the carbide region 204.

Figure 2B:
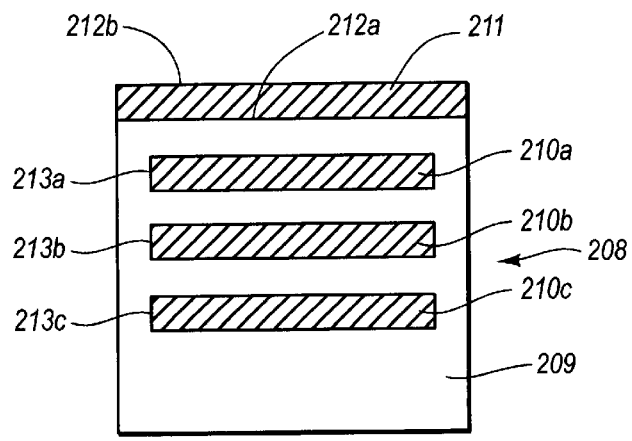

FIG. 2b shows the cross section of an alternative embodiment 208 of the PDC of this invention. A carbide substrate 209 is provided having a recesses 213a–c, within which diamond cores 210a–c are sintered in place. A outer diamond region 211 is provided on the top surface 212a of the substrate 209. In this embodiment 208 the diamond cores 210a–c and the diamond surface region 211 are separate diamond regions, having intervening carbide layers. The top surface 212b of the diamond surface region 211 provides the cutting surface of the PDC 208.

Figure 2C:
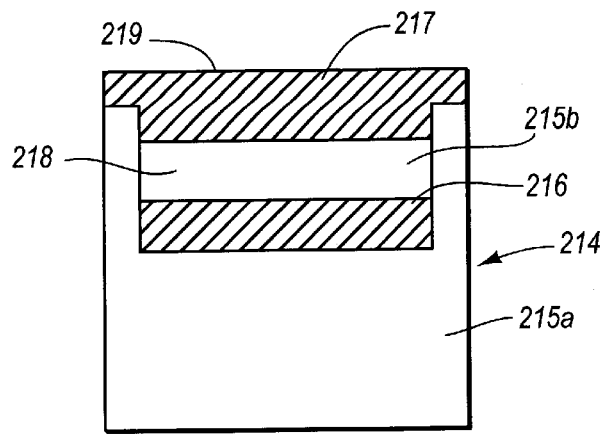

FIG. 2c shows the cross section of an alternative embodiment 214 of the PDC of this invention. A carbide substrate 215a is provided having a deep recess 218, within which a diamond core 216 is sintered in place along with a second carbide region 215b. In this embodiment 214 the diamond core 216 and the diamond surface region 217 are separate bodies of diamond material, with an intervening carbide layer 215b. The top surface 219 of the diamond surface region 217 provides the cutting surface of the PDC 214.

Figure 2D:
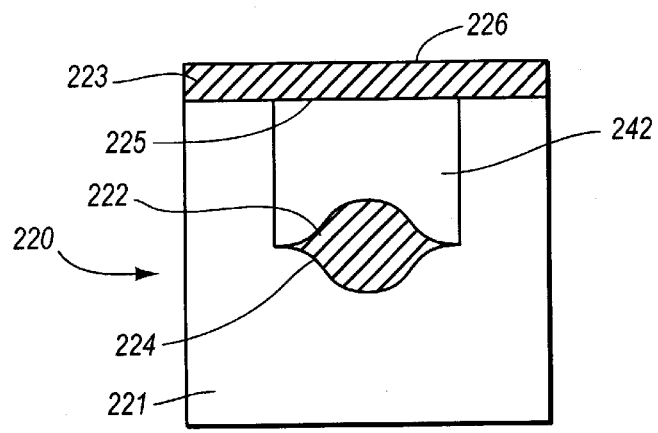

FIG. 2d shows the cross section of an alternative embodiment 220 of the PDC of this invention. A carbide substrate 221 is provided having an internal cavity 224, within which a diamond core 222 is sintered in place. A second carbide region 242 is provided to enclose the diamond core 222. In this embodiment 220, the carbide substrate 221 and the second carbide region 242 fully enclose the diamond core 222. Sintered to the top surface 225 of the carbide substrate 221 is a diamond surface region 223, the top surface 226 of which provides the cutting surface of the PDC 220. In this embodiment 220 of this invention, the diamond core 222 may or may not necessarily be composed of the same material composition as the diamond surface region 223.

Figure 2E:
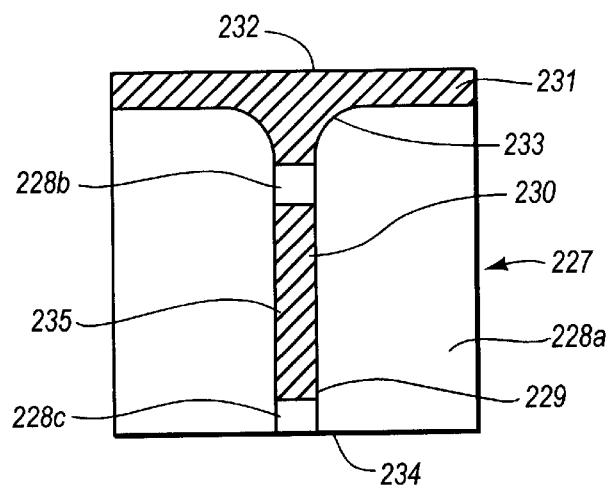

FIG. 2e shows the cross section of an alternative embodiment 227 of the PDC of this invention. A carbide substrate 228a is provided having an internal channel 229 running essentially completely from the top 233 to the bottom 234, through essentially the center 235, of the substrate 228. Within this channel 229 a diamond core 230 is sintered and two carbide segments 228b,c provide carbide layers to the diamond core 230 and the diamond surface region 231. In this embodiment 227 of the invention, the diamond core 230 and the diamond surface region 231 are separate diamond regions, with an intervening carbide layer 228b. The top surface 232 of the diamond surface region 231 provides the cutting surface of the PDC 227.

Figure 2F:
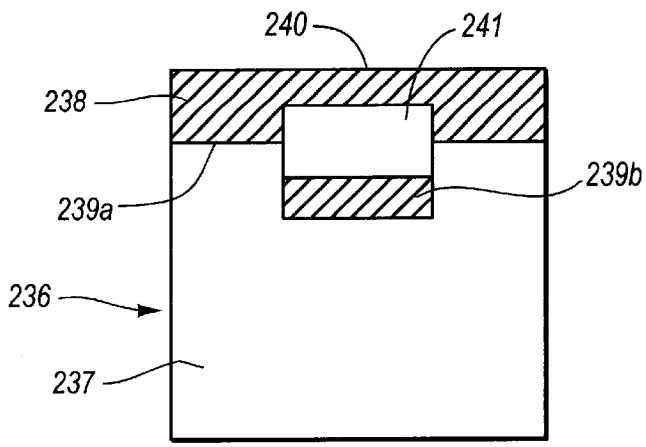

FIG. 2f shows the cross section of an alternative embodiment 236 of the PDC of this invention. A carbide substrate 237 is provided with a top surface 239a which has been ground or otherwise evacuated in order to provide a diamond surface region 239b that is separated from the diamond surface region 238 by an intervening carbide region 241. This intervening carbide region 241 extends beyond the substrate 237 into the diamond surface region 238. The top surface 240 of the diamond surface region 238 provides the cutting surface of the PDC 236.

Figure 2G:
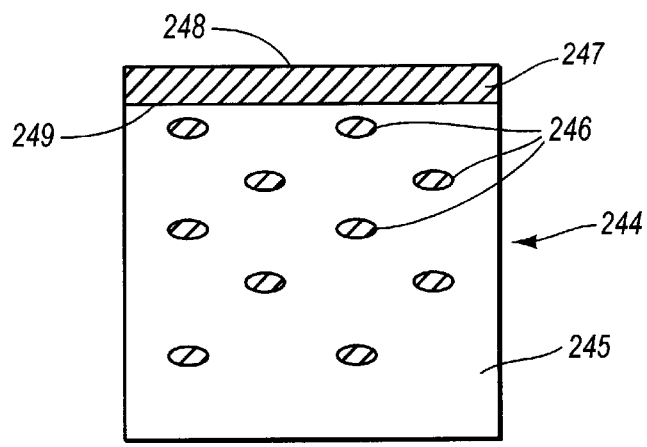

FIG. 2g shows the cross section of an alternative embodiment 244 of the PDC of this invention. A carbide substrate 245 is provided having multiple diamond regions 246 interspersed throughout. In this embodiment 244 the carbide substrate 245 completely encloses each diamond region 246. Sintered to the top surface 249 of the carbide substrate 245 is a diamond surface region 247, the top surface 248 of which provides the cutting surface of the PDC 244. In this embodiment 244 of the invention, the diamond regions 246 may or may not be composed of the same material composition as the diamond surface region 247.

Figure 2H:
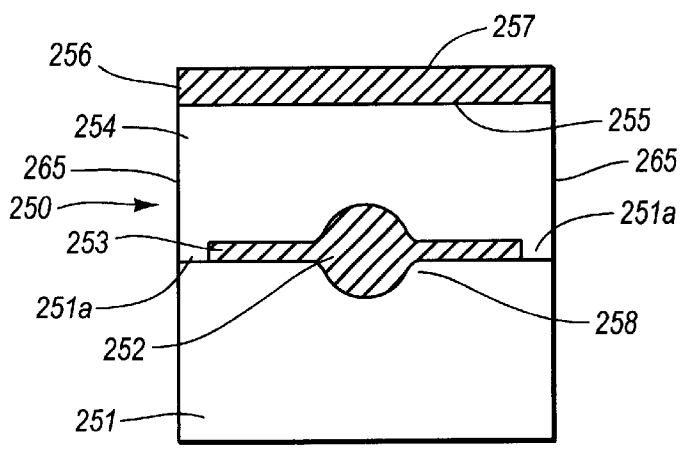

FIG. 2h shows the cross section of an alternative embodiment 250 of the PDC of this invention. A carbide substrate 251 is provided with a diamond core 252 and diamond layer 253, extending from the core 252, sintered to the substrate 251 top surface 258. A carbide ring 251a surrounds the periphery of the diamond region 252 ensuring that the diamond core 252 does not extend to the exterior sidewall 265 of the PDC. A second carbide region 254 is sintered to the diamond core 252 and diamond layer 253, providing a buffer between the diamond core 252 and the diamond surface region 256, which is sintered to the top surface 255 of the second carbide region 254. The top surface 257 of the diamond surface region 256 provides the cutting surface of the PDC. In this embodiment 250 of the invention it is not necessary that the diamond surface region 256, the diamond core 252, or the diamond layer 253 be composed of the same material composition. Similarly, it is not necessary that the carbide substrate 251 and the second carbide region 254 be the same carbide material.

Figure 2I:
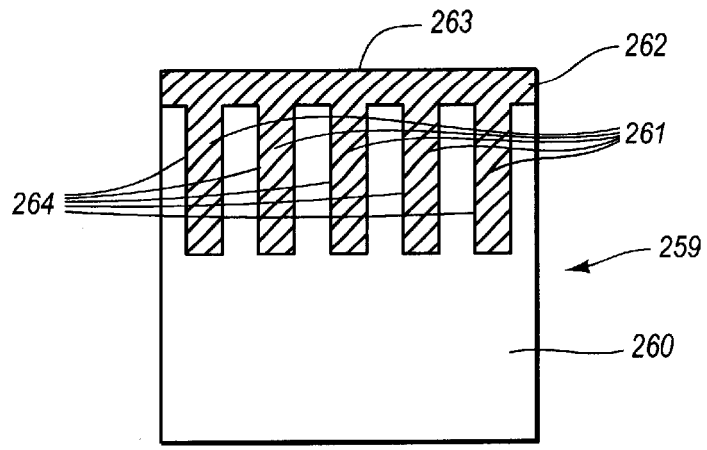

FIG. 2i shows the cross section of an alternative embodiment 259 of this invention. A carbide substrate 260 is provided having a number of recesses 264, within which a number diamond core protrusions 261 are sintered in place. In this embodiment 259 the diamond core protrusions 261 and the diamond surface region 262 are portions of the same diamond material, without an intervening carbide layer. The top surface 263 of the diamond surface region 262 provides the cutting surface of the PDC 259. In alternative embodiments of this 259 configuration of the invention, the protrusions 261 are not of the same diamond material as the diamond surface region 262. It is also envisioned that a carbide gap may be used between the diamond surface region 262 and one or more of the protrusions 261.

Figure 2J:
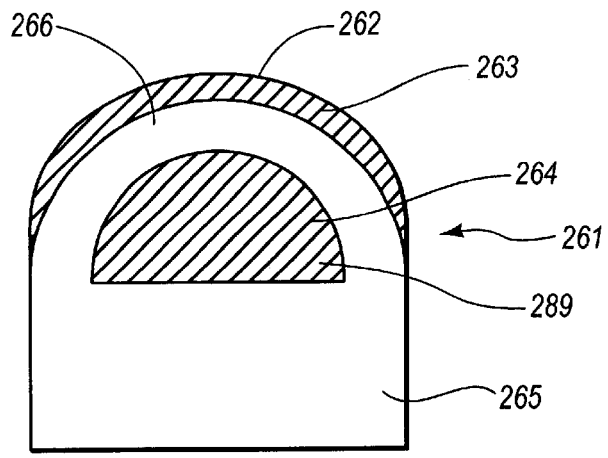

FIG. 2j shows the cross section of another alternative embodiment 261 of the invention. A carbide substrate 265 is provided which has a cavity 264 within which polycrystalline diamond 289 is sintered in place. This embodiment 261 has a generally hemispherical top surface 262, which is covered with polycrystalline diamond 263. A carbide region 266 and the carbide substrate 265 surround the internal diamond region 264b. The diamond surface 262 and the internal diamond region 264b may or may not necessarily be the same diamond material.

Figure 2K:
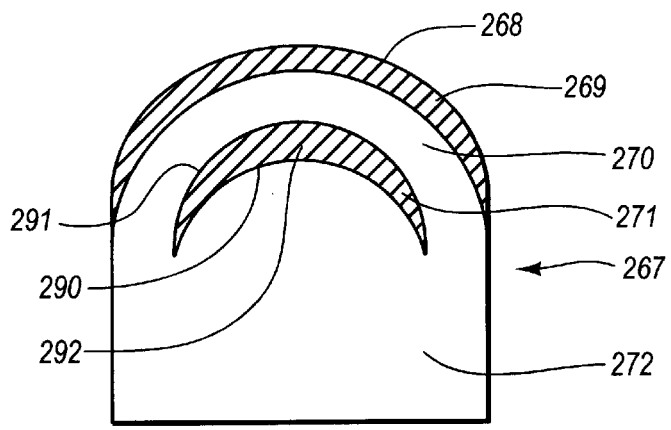

FIG. 2k shows the cross section of another alternative embodiment 267 of the invention. This embodiment 267, like that of FIG. 2j, 261, has a cavity 271 within the carbide substrate 272, within which a polycrystalline diamond region 292 is sintered. The internal cavity 271 and internal polycrystalline diamond region 292 of this embodiment 267 has a convex upper surface 291 and a concave lower surface 290. This embodiment 267 has a generally hemispherical top surface 268 that is covered by polycrystalline diamond 269. Carbide regions 270, 272 surround the internal diamond region 292. The diamond surface 269 and the internal diamond region 292 may or may not necessarily be the same diamond material.

Figure 2L:
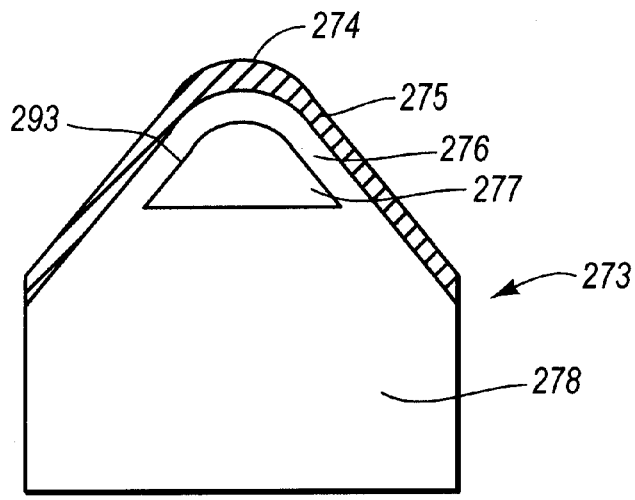

FIG. 2l shows the cross section of another alternative embodiment 273 of the invention. A carbide substrate 278 is provided which has a cavity 293 within which polycrystalline diamond 277 is sintered in place. This embodiment 273 has a generally conical top surface 274, which is covered with polycrystalline diamond 275. A carbide region 276 and the carbide substrate 278 surround the internal diamond region 277. The diamond surface 275 and the internal diamond region 277 may or may not necessarily be the same diamond material.

Figure 2M:
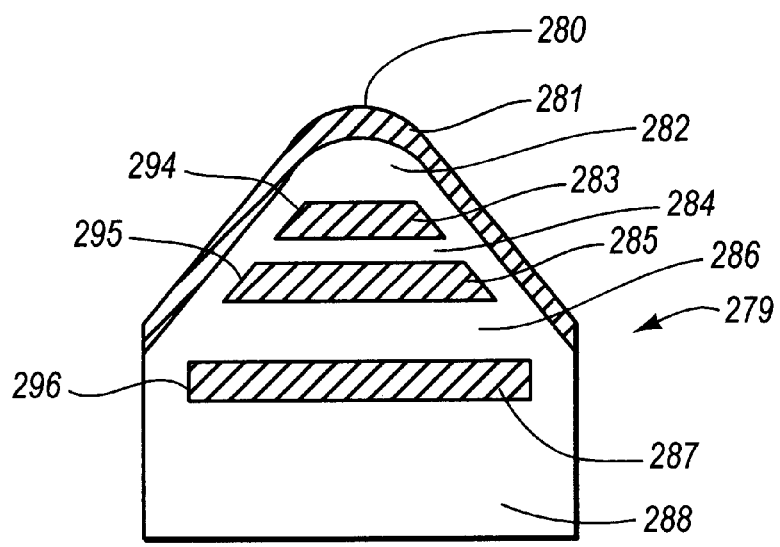

FIG. 2m shows the cross section of another alternative embodiment 279 of the invention. A carbide substrate 288 is provided which has three cavities 294, 295, 296 within each of which are polycrystalline diamond regions 283, 285, 287 sintered in place. This embodiment 279 has a generally conical top surface 280 which is covered with polycrystalline diamond 281. The internal diamond regions 283, 285, 287 are surrounded by a carbide regions 282, 284, 286 and the carbide substrate 288. The diamond surface 281 and the internal diamond regions 283, 28, 287 may or may not necessarily be the same diamond material.

While the FIGS. 2a–m show multiple regions of carbide and diamond, the reader should be aware that after the sintering process step the carbide components are sintered into one apparent carbide mass. Similarly, after sintering adjacent polycrystalline diamond regions are sintered together, forming a single diamond region.

FIGS. 3a–k show a variety of different embodiments of this invention having one or more carbide cores surrounded by diamond regions. These embodiments are intended to be examples of the variety of different embodiments of PDCs of this invention and are not intended to be either exhaustive or limiting. Moreover, these embodiments may, but are not required to, work in combination with a carbide substrate. In each of these, below illustrated embodiments, the carbide cores are typically sintered within the diamond regions, using a process that forms the diamond region and bonds the carbide region during the sintering process step or steps.

Figure 3A:
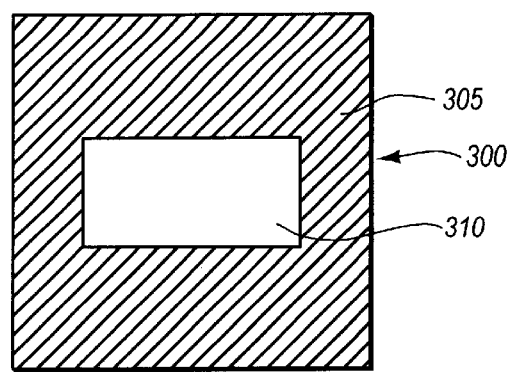
FIGS. 3a–k depict section views of preferred PDC embodiments having an entirely diamond outer surface, which encloses a metal substrate.

FIG. 3a shows the cross section of a first embodiment 300 of the diamond region of a PDC. In this embodiment 300, diamond 305 completely surrounds an internal carbide core 310. The carbide core 310 of this embodiment 300 has a cylindrical shape and is positioned generally in the center of the diamond region 305.

Figure 3B:
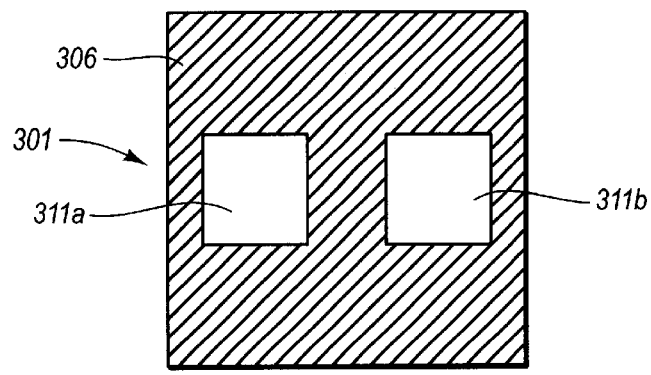

FIG. 3b shows the cross section of a second embodiment 301 of the diamond region of a PDC. This embodiment has two or more carbide cores 311a,b arranged generally at the same depth within the diamond 306 portion of the PDC, with diamond interspaced there between. Alternatively, the carbide core 311 of this invention could also be a carbide ring—providing the same cross-sectional appearance.

Figure 3C:
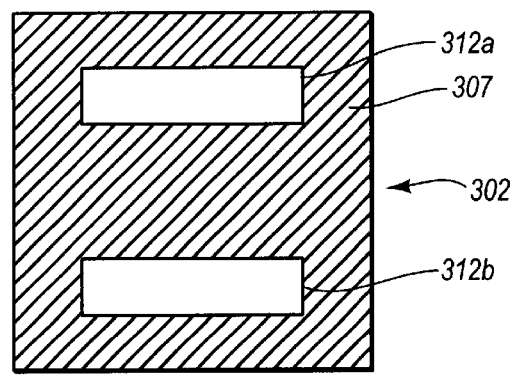

FIG. 3c shows the cross section of a third embodiment 302 of the diamond region of a PDC. This embodiment has two carbide cores 312a,b arranged at different depths in the diamond portion 307 of the PDC, with diamond interspaced there between.

Figure 3D:
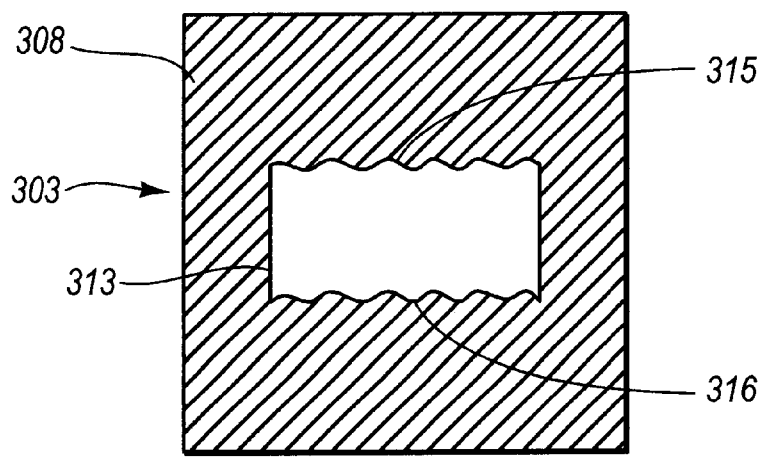

FIG. 3d shows the cross section of a fourth embodiment 303 of the diamond region of a PDC. This embodiment has a single carbide core 313, which has a roughness imposed both on the top 315 and the bottom 316 of the carbide core 313 to enhance the adhesion properties of the carbide-diamond interface during wear of the PDC. In alternative embodiments of this invention any number of interface geometry's may be employed to enhance the attachment properties of the carbide-diamond interface.

Figure 3E:
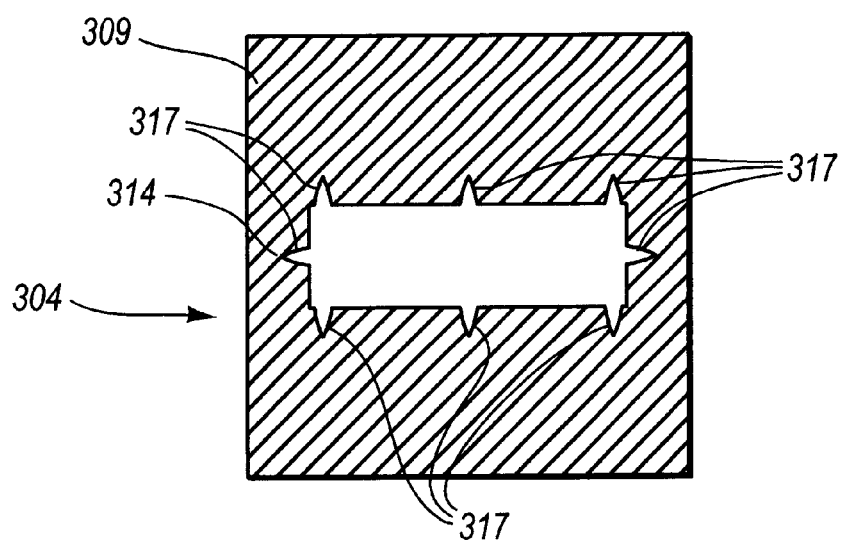

FIG. 3e shows the cross section of a fifth embodiment 304 of the diamond region of a PDC. This embodiment has a single carbide core 314 with large protruding features 317 extending into the surrounding diamond region 309 to provide local compression at the diamond surface.

Figure 3F:
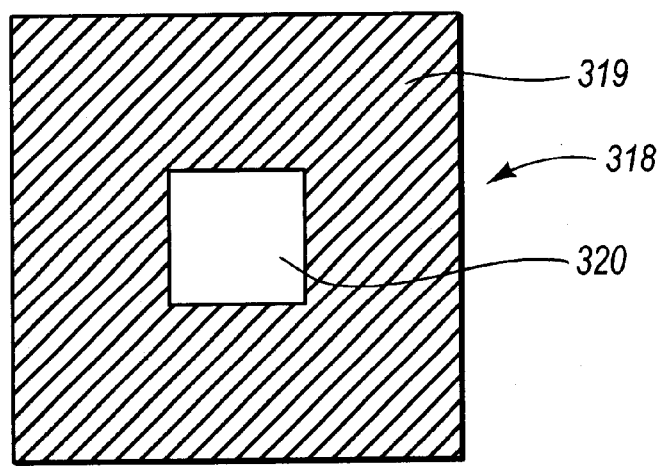

FIG. 3f shows the cross section of a sixth embodiment 318 of the diamond region of a PDC. This embodiment has a carbide core 320 and a relatively large surrounding diamond layer 319.

Figure 3G:
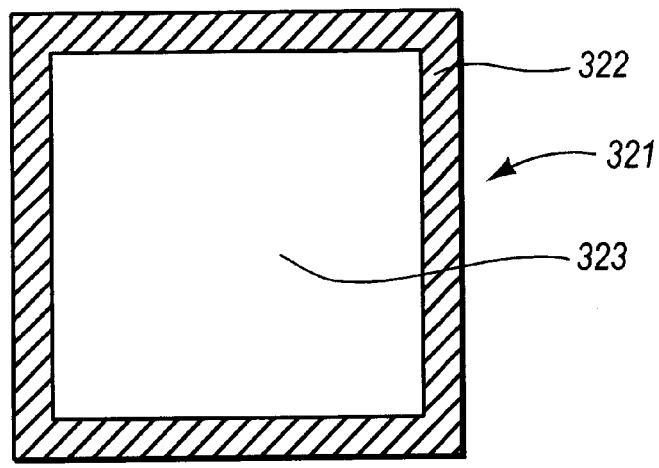

FIG. 3g shows the cross section of a seventh embodiment 321 of the diamond region of a PDC. This embodiment has a carbide core 323 and has a relatively thin surrounding diamond layer 322.

Figure 3H:
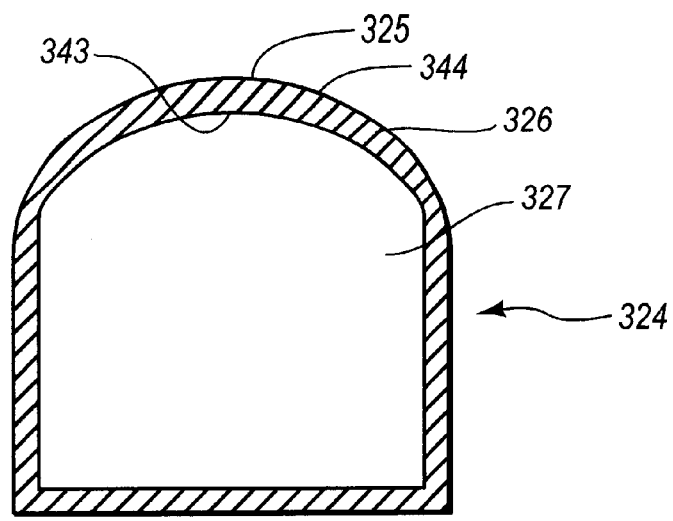

FIG. 3h shows the cross section of an alternative embodiment 324 of the diamond region of a PDC. In this embodiment 324, diamond 326 completely surrounds an internal carbide core 327. The carbide core 327 of this embodiment 324 has a generally cylindrical shape and is positioned generally in the center of the diamond region 326. In this embodiment 324, a generally hemispherical top shape 325 is imposed on the top surfaces 342, 343 of both the diamond layer 326 and the carbide core 327.

Figure 3I:
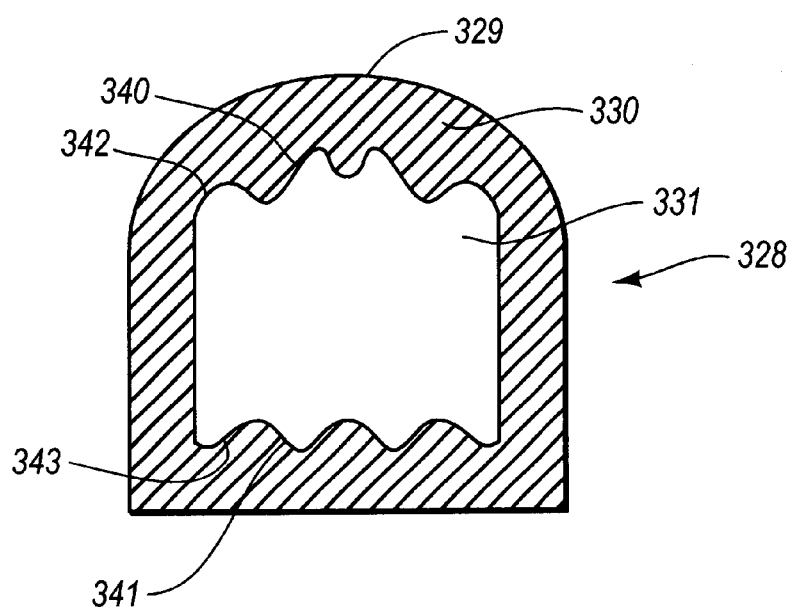

FIG. 3i shows the cross section of a still further alternative embodiment 328 of the diamond region of a PDC. In this embodiment 328, diamond 330 completely surrounds an internal carbide core 331. The carbide core 331 of this embodiment 328 has a cylindrical shape with irregularities 340, 341 on the top surface 344 and the bottom surface 343 of the carbide core 331 and is positioned generally in the center of the diamond region 330. The diamond region 330 is provided with a generally hemispheric top surface 329.

Figure 3J:
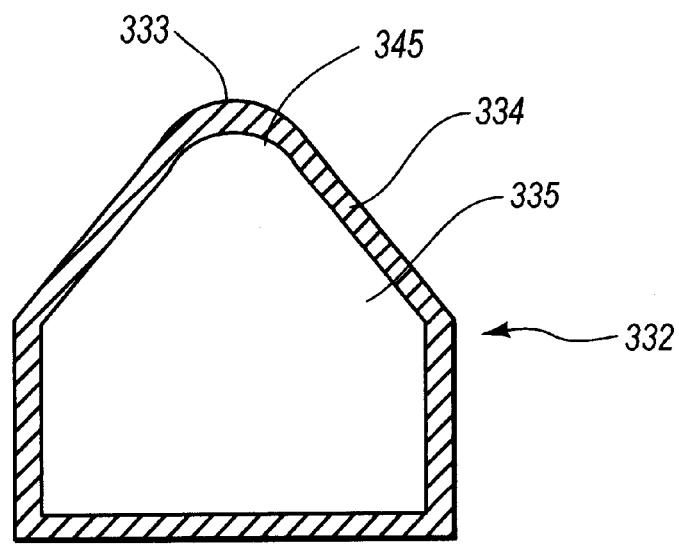

FIG. 3j shows the cross section of an alternative embodiment 332 of the diamond region of a PDC. In this embodiment 332, diamond 334 completely surrounds an internal carbide core 335. The carbide core 335 of this embodiment 332 has a generally cylindrical shape and is positioned generally in the center of the diamond region 305. In this embodiment 332 both the diamond region 334 and the carbide region 335 have a generally conic shaped top surfaces 333, 345.

Figure 3K:
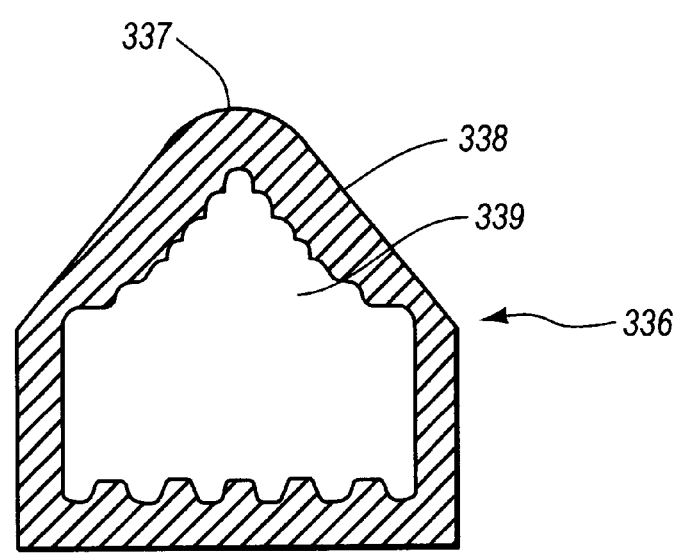

FIG. 3k shows the cross section of another alternative embodiment 336 of the diamond region of a PDC. In this embodiment 336, diamond 338 completely surrounds an internal carbide core 339. The carbide core 339 of this embodiment 336 has an irregular shape and is positioned generally in the center of the diamond region 338. This embodiment 336 has a generally conic shaped top surface 337 to the diamond region 338

Figure 4A:
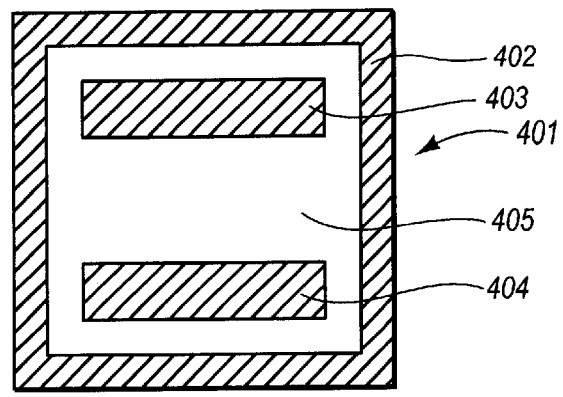
FIGS. 4a, b and c depict section views of preferred PDC embodiments having a diamond outer surface as well as enclosed diamond regions within the substrate.
Figure 4B:
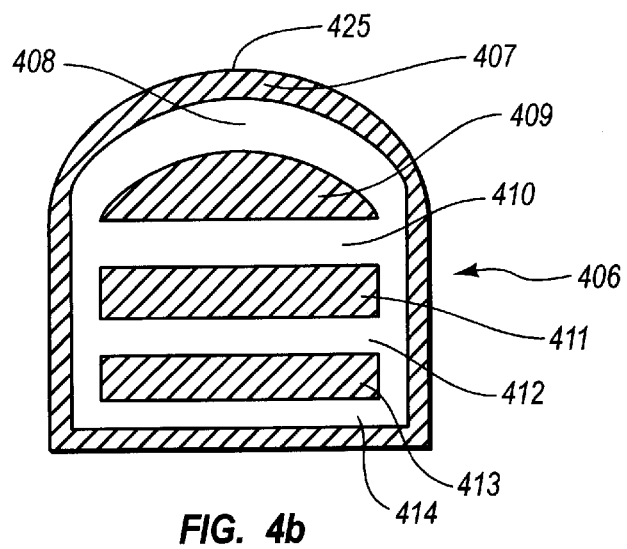
Figure 4C:
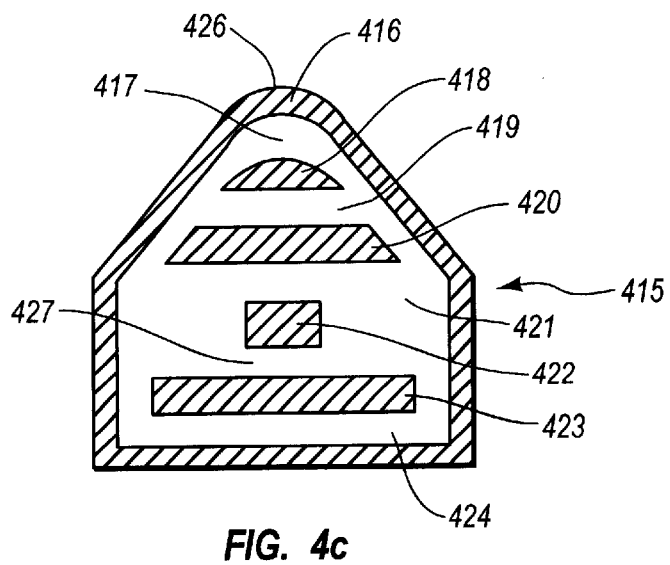

FIGS. 4a, b and c show a cross-sections of embodiments 401, 406, 415 of the invention employing features of both FIG. 1 and FIGS. 3a–g, by having carbide cores 405, 410, 421 surrounded by a relatively thin surrounding diamond layer 402, 407, 416. Internal to the carbide cores 405, 410, 421 are a plurality of diamond regions 403, 404, 409, 411, 413, 418, 420, 422, 423. In FIG. 4b the top surface 425 of the diamond layer 407 has a generally hemispherical shape and in FIG. 4c the top surface 426 of the diamond layer 416 has a generally conic shape. The internal diamond regions 409, 411, 413 and the diamond layer 407 of FIG. 4b are separated by intervening carbide regions 408, 410, 412, 414. The internal diamond regions 418, 420, 422, 423 and the diamond layer 416 of FIG. 4c are separated by intervening carbide regions 417, 419, 421, 427, 424.

The embodiments of the present invention are shown with a generally flat diamond surface and typically would be standard cylindrical PDCs, although, alternatively, oval, triangular, square, rectangular or other shaped PDCs are contemplated, as are diamond top surfaces with complex surface features including ribs, protrusions, recesses, buttons, channels, hemispherical, conic, convex and other cutting surface shapes. Also, it is contemplated that the periphery of the cutting surface would have a chamfer. Again, although the interfaces between the carbide regions are generally shown as smooth, it would also be possible to include in the interface a variety of mechanical modifications (e.g., ridges, protrusions, depressions, grooves, undulations or dimples, or chemical modifications) to enhance both the adhesion between the diamond and carbide, as well as the manipulation of stress between the materials employed.

The PDCs of this invention, as shown in FIGS. 1 and 2a–m, are typically and preferably fabricated by placing a carbide substrate, having a provided cavity, in a can assembly. Diamond crystals or grains are placed into the cavity in the carbide substrate. Additional carbide is placed in the cavity over the diamond. Next, additional diamond is placed over the finished substrate with the enclosed diamond core. The can assembly is then completed by placing additional cans around the carbide and diamond regions. High Pressure and High Temperature are applied, in a manner well known in the art, which allows the cobalt from the tungsten carbide to sweep through the diamond, thereby causing the sintering of the carbide diamond regions into the desired PDC structure. A number of such can assemblies can be loaded into a high-pressure press simultaneously. The result of the High Pressure/High Temperature press causes the metal binder from the substrate body and carbide core or layer to be swept to the diamond regions through the diamond crystals and to act as a reactive phase to thereby promote the sintering of the diamond grains to form a polycrystalline diamond structure bonded to a carbide substrate. As a result, the diamond grains become mutually bonded together forming one or more diamond masses. The heat and pressure is removed, after which, the PDC is removed from the can. The diamond is subsequently lapped to smooth and flatten the top diamond surface, if desired. A centerless grinding ("CG") of the PDC is performed to bring the PDC to its final diameter and to remove the can material from the PDC. The PDC is next sized typically using a surface grinding operation, to finalize the length of the PDC. The typical final processing step is chamfering of the periphery of the top diamond surface and the carbide back surface.

The preferred processing method of the cutter elements shown in FIGS. 3a–k and 4a–c are typically manufactured by placing diamond into a can, onto which a carbide core is placed on the diamond surface. Additional diamond is added around the carbide core, completely enclosing it. The can assembly is completed prior to HP/HT pressing-sintering as described above.

The metal binder may remain in the diamond layer within the pores existing between the diamond grains or may be removed and optionally replaced by another material, as known in the art, to form a so-called thermally stable diamond. Where the binder is removed by leaching the diamond pores may be back-filled with silicon, or alternatively another material having a coefficient of thermal expansion similar to that of diamond. Variations of this general process exist in the art, but this detail is provided so that the reader will understand the general concept of sintering a diamond layer onto a substrate in order to form a cutter or insert.

Typically, the desired surface shape of the diamond layer is achieved by utilizing preformed cans. Alternatively, the surface shape can be formed by grinding or even through the use of etching, electrical discharge machining ("EDM") or electrical discharge grinding ("EDG"), etc.

The described embodiments are to be considered in all respects only as illustrative of the current best mode of the invention known to the inventor at the time of filing the patent application, and not as restrictive. Although several of the embodiments shown here include particular diamond and/or carbide core geometry, these are intended to be examples of the best mode only and is not intended to be limiting. The scope of this invention is, therefore, indicated by the appended claims rather than by the foregoing description. All devices that come within the meaning and range of equivalency of the claims are to be embraced as within the scope of this patent.

I claim:

1. A polycrystalline diamond compact, comprising:
   (A) a layer of superabrasive material;
   (B) a substrate attached to said layer of superabrasive material;
   (C) a diamond core completely enclosed within an internal cavity of said substrate.

2. A polycrystalline diamond compact, as recited in claim 1, wherein a carbide layer is present between said diamond core and the surface of said layer of superabrasive material.

3. A polycrystalline diamond compact, as recited in claim 1, further comprising a carbide core within said layer of superabrasive material.

4. A polycrystalline diamond compact, as recited in claim 1, wherein said substrate is a carbide selected from the group consisting of tungsten carbide, niobium carbide, zirconium carbide, hafnium carbide, vanadium carbide, tantalum carbide, and titanium carbide.

5. A polycrystalline diamond compact, as recited in claim 1, wherein said layer of superabrasive material is selected from the group of polycrystalline diamond and polycrystalline cubic boron nitride.

6. A polycrystalline diamond compact, as recited in claim 1, wherein said diamond core separates said substrate into two portions.

7. A polycrystalline diamond compact, as recited in claim 1, further comprising a second diamond core fixed within said internal cavity of said substrate.

8. A polycrystalline diamond compact, comprising:
   (A) a polycrystalline diamond region, having an exterior, a cutting surface, and an interior; and
   (B) a first carbide core enclosed within said interior of said polycrystalline diamond region.

9. A polycrystalline diamond compact, as recited in claim 8, further comprising a second carbide core enclosed within said interior of said polycrystalline diamond region.

10. A polycrystalline diamond compact, as recited in claim 8, wherein said carbide core is a material selected from the group consisting of tungsten carbide, niobium carbide, zirconium carbide, hafnium carbide, vanadium carbide, tantalum carbide, and titanium carbide.

11. A polycrystalline diamond compact, as recited in claim 8, wherein said carbide core further comprises one or more protrusions extending from said carbide core into said interior of said polycrystalline diamond region.

12. A polycrystalline diamond compact, as recited in claim 8, further comprising a diamond region enclosed within said first carbide core.

* * * * *